United States Patent
Hisanaga et al.

[11] Patent Number: 5,958,594
[45] Date of Patent: Sep. 28, 1999

[54] INSULATING URETHANE-FORMING CURABLE COMPOSITIONS AND INSULATED ELECTRIC OR ELECTRONIC PART OR DEVICE

[75] Inventors: Naokatsu Hisanaga, Osaka; Kenji Ueda, Itami; Kenji Ishii, Otsu; Eiji Tsunematsu, Ibaraki; Susumu Kusakawa, Yokkaichi; Takashi Hamaguchi, Yokkaichi; Masaya Itoh, Yokkaichi; Yoshitsugu Morimoto, Yokkaichi, all of Japan

[73] Assignees: San-Yu Resin Kabushiki Kaisha, Osaka; Itoh Seiyu Kabushiki Kaisha, Mie, both of Japan

[21] Appl. No.: 08/923,531

[22] Filed: Sep. 4, 1997

[30] Foreign Application Priority Data

Sep. 6, 1996 [JP] Japan ......................... 257486

[51] Int. Cl.$^6$ ............................. B32B 27/40; C08L 75/00
[52] U.S. Cl. .................................. 428/423.1; 428/425.9; 528/74.5; 528/75; 528/83
[58] Field of Search .............. 528/74.5, 75, 83; 428/423.1, 425.9

[56] References Cited

U.S. PATENT DOCUMENTS

| | | | |
|---|---|---|---|
| 4,742,112 | 5/1988 | Brauer et al. | 524/705 |
| 4,937,305 | 6/1990 | Okamoto et al. | 528/65 |

FOREIGN PATENT DOCUMENTS

| | | |
|---|---|---|
| 6-220157 | 8/1994 | Japan . |
| 7-102033 | 4/1995 | Japan . |

OTHER PUBLICATIONS

"Mechanical and Swelling Properties of HTPB–Based Copolyurethane Networks," by S.R. Jain et al., *Journal of Applied Polymer Science*, vol. 48, pp. 1515–1523 (1993).

*Primary Examiner*—D. S. Nakarani
*Attorney, Agent, or Firm*—Armstrong, Westerman, Hattori, McLeland & Naughton

[57] ABSTRACT

A urethane-forming curable composition which has a low viscosity and therefore can sufficiently flow around to details or minute cavities of electric or electronic parts or devices to seal the same and which can give flexible curing products excellent in heat resistance, hydrolysis resistance (wet heat resistance) and moistureproofness and capable of preventing hardness changes as well as reductions in insulating performance over a long period of time even under severe conditions and therefore can reliably protect the electric or electronic parts or devices. A hydrogenated OH-containing liquid polyisoprene (X) and a polyester polyol (Y) which is liquid at ordinary temperature and is constituted of fatty acid units (A) and polyhydric alcohol units (B) and which has an iodine value of not more than 50 are combinedly used as the polyol component. The fatty acid units (A) of this polyester polyol (Y) at least partly comprise hydroxy fatty acid oligomer (at least dimer) units (a). Electric or electronic parts or devices are treated for moistureproofness with the curing product of this urethane-forming curable composition.

6 Claims, No Drawings

INSULATING URETHANE-FORMING CURABLE COMPOSITIONS AND INSULATED ELECTRIC OR ELECTRONIC PART OR DEVICE

FIELD OF THE INVENTION

The present invention relates to an electrically insulating urethane-forming curable composition capable of providing good heat resistance, hydrolysis resistance and moistureproofness. It also relates to electrically insulated electric or electronic parts or devices treated for moistureproofness with said composition.

PRIOR ART

In view of the current trends in electric or electronic parts or devices toward higher density and larger-scale integration and toward increased reliability, attempts have been made to neutralize the influences of moisture and the like in the environment on various electric or electronic parts or devices (e.g. printed circuit boards) by sealing them with a resin. And, the sealing of those electric or electronic parts or devices which are used in automotive engine systems, hot water supply systems, outdoor pumps and the like is required to assure not only their moisture resistance but also their reliability even at elevated temperatures or under wet heat conditions.

The sealing resin to be used for that purpose must be one which will not impose stress on electric or electronic parts or devices so that their performance can be prevented from falling off due to temperature cycle-caused cracking in soldered portions, for instance. Thus, flexible resins with a low hardness, such as silicone resins and urethane resins, are generally used.

Among these, silicone resins are excellent in heat resistance, flexibility and low temperature properties but have their limits: they are expensive, fail to give sufficiently firm adhesion to materials constituting electric or electronic parts or devices, are highly permeable to moisture, hence fail to completely prevent moisture from influencing thereon, and are of low mechanical strength.

As for urethane resins, proposals have been made to use a hydrogenated OH-containing liquid polyisoprene as a polyol component. Said hydrogenated OH-containing liquid polyisoprene is free of double bonds or low in double bond content and therefore can give cured urethane products having good heat resistance and favorable flexibility.

Thus, Japanese Kokai Tokkyo Koho H06-220157 discloses a liquid polymer composition which comprises a hydrogenation product (1) derived from an OH-containing liquid diene polymer with at least 60% of the conjugated diene units bound together via 1,4-bonding, a reactive diluent (2) comprising a saturated dihydric alcohol with 16 to 80 carbon atoms and/or a hydrogenation product derived from an OH-containing liquid diene polymer with at least 60% of the conjugated diene units bound together via 1,2-bonding, a plasticizer (3) and a polyisocyanate compound (4). The $C_{16-80}$ saturated dihydric alcohol is, for example, a dimer diol. The proportion of the plasticizer is, according to Examples 1 to 7 thereof, 100, 100, 100, 130, 130, 100 or 30 parts by weight per 100 parts by weight of the hydrogenated OH-containing liquid diene polymer (1).

Japanese Kokai Tokkyo Koho H07-102033 discloses a heat-resistant resin composition which comprises a hydrogenation product (1) derived from an OH-containing liquid polyisoprene, a castor oil derivative (2) and a polyisocyanate (3). The castor oil derivative (2) is, for example, a transesterification product derived from castor oil and an alcohol.

Proposals have also been made to use, as the polyol component in urethane type resins, a polyester polyol derived from esterification of an oligomer of a hydroxy fatty acid such as 12-hydroxystearic acid or licinoleic acid with a polyhydric alcohol.

Thus, Japanese Kokai Tokkyo Koho H04-96916 discloses a technology which comprises incorporating an internal mold release agent comprising an ester group-containing condensation product with an acid value of not more than 5 (the hydroxyl value being 32.2 or 33.0 according to the examples) as produced from 3 to 15 moles of 12-hydroxystearic acid and 1 mole of a polyhydric alcohol (in the examples, 1,6-dihydroxyhexane or polyethylene glycol) or a polyamine into an active hydrogen-containing composition, which is to be admixed with an organic polyisocyanate and reacted with the same in closed molds (i.e. by the RIM technique) for the production of elastic elastomer moldings (typically, exterior parts of automotive bodies, such as bumpers). The proportion of the internal mold release agent is 0.5 to 30 parts by weight per 100 parts by weight of the total reaction mixture. Examples of the polyol to be used as said active hydrogen-containing composition together with said internal mold release agent are, according to the examples thereof, glycerol-initiated polyoxyalkylene polyether polyol and amino-terminated polyether diamine.

Japanese Kokai Tokkyo Koho S61-91216 discloses the use, as an internal mold release agent, of an ester produced from 3 to 15 moles of licinoleic acid and 1 mole of monohydric or polyhydric alcohol (in particular 1,6-dihydroxyhexane) and having an average molecular weight of 90 to 4,500, an acid value of not more than 5 and a hydroxyl value of 12.5 to 125 in producing polyurethane elastomers with a mean density of 0.8 to 1.4 $g/cm^3$ by reacting an organic polyisocyanate, a solution of a specific chain extender in a polyhydroxyl compound and said internal mold release agent with one another in closed molds (i.e. by the RIM technique). The proportion of the internal mold release agent is 0.5 to 30 parts by weight per 100 parts by weight of the total reaction mixture.

The liquid polymer composition disclosed in Japanese Kokai Tokkyo Koho H06-220157 contains a large amount of a plasticizer for hardness reduction and, therefore, when used as a sealing resin for electric or electronic parts or devices, inevitably produces adverse effects due to the plasticizer (e.g. hardness changes with time, deterioration of electric characteristics due to bleeding of the plasticizer).

The heat-resistant resin composition disclosed in Japanese Kokai Tokkyo Koho H07-102033 tends to undergo hardness changes with time at elevated temperatures or under wet heat conditions, hence renders the life and reliability of electric or electronic parts or devices questionable.

The elastic elastomer disclosed in Japanese Kokai Tokkyo Koho H04-96916 is limitedly intended for the manufacture of polyurethane moldings (in particular moldings such as automotive bumpers etc.) by the RIM technique, hence attention has been turned to the moldability from molds in the step of molding in the manner of RIM but not to the use as an insulating sealant where other physical properties and characteristics than those required of RIM moldings are required. Even if such elastic elastomer is used as an insulating sealant, the adhesiveness will be insufficient, hence the elastomer will be unsuited for use as such sealant.

The internal mold release agent disclosed in Japanese Kokai Tokkyo Koho S61-912116, which comprises an ester produced from 3 to 15 moles of licinoleic acid (namely castor oil fatty acid) and 1 mole of monohydric or polyhydric alcohol, is intended only for special use as internal mold release agent and furthermore has a problem in that it has a high iodine value, hence is poor in heat resistance.

In such background, the present invention has for its object to provide, by using a hydrogenated OH-containing liquid polyisoprene and a specific polyester polyol containing hydroxy fatty acid oligomer units combinedly as a polyol component, an electrically insulating urethane-forming curable composition which has a low viscosity and therefore can sufficiently go around to details or minute cavities or the like of electric or electronic parts or devices to seal the same and which can give flexible curing products excellent in heat resistance, hydrolysis resistance (wet heat resistance) and moistureproofness and protected from hardness changes and reductions in insulating performance over a long period of time even under severe conditions and therefore can reliably protect the electric or electronic parts of devices, and to provide electrically insulated electric or electronic parts or devices treated for moistureproofness with the curing product produced from said composition.

SUMMARY OF THE INVENTION

The present invention provides an insulating urethane-forming curable composition comprising a polyol component and a polyisocyanate component which composition is characterized in that the polyol component comprises a hydrogenated OH-containing liquid polyisoprene (X) and a polyester polyol (Y) which is composed of fatty acid units (A) and polyhydric alcohol units (B), occurs as a liquid at ordinary temperature and has an iodine value of not more than 50, and that the fatty acid units (A) in said polyester polyol (Y) at least partly comprise hydroxy fatty acid oligomer (at least dimer) units (a) resulting from condensation of at least two OH-containing fatty acid molecules, or at least one OH-containing fatty acid molecule and at least one OH-free fatty acid molecule.

The present invention also provides an electric or electronic part or device subjected to moisture-proof treatment with a cured product produced from the above-mentioned insulating urethane-forming curable composition.

DETAILED DESCRIPTION OF THE INVENTION

The present invention is now described in detail.
Polyol component
In accordance with the present invention, the polyol component comprises a hydrogenated OH-containing liquid polyisoprene (X) and a polyester polyol (Y) which is composed of fatty acid units (A) and polyhydric alcohol units (B), occurs as a liquid at ordinary temperature and has an iodine value of not more than 50.
Hydrogenated OH-containing liquid polyisoprene (X)

The hydrogenated OH-containing liquid polyisoprene (X), which is a constituent of the polyol component, is a product derived from an internal or terminal OH-containing polyisoprene having a number average molecular weight of about 300 to 25,000, preferably about 500 to 20,000, more preferably about 700 to 10,000 by hydrogenation of the double bonds of said polyisoprene using a hydrogenation catalyst such as platinum or palladium. From the flexibility viewpoint, the starting OH-containing polyisoprene should preferably contain a 1,4-structure, such as the cis-1,4 or trans-1,4 structure, in a proportion of at least 70%. As such hydrogenated OH-containing liquid polyisoprene, there may be mentioned, for example, the commercial product available from Idemitsu Petrochemical under the trademark "Epol".
Polyester polyol (Y)

The polyester polyol (Y), which is another constituent of the polyol component, is composed of fatty acid units (A) and polyhydric alcohol units (B).

The fatty acid units (A) comprise, at least partly, hydroxy-fatty acid oligomer (at least dimer) units (a) resulting from condensation of at least two OH-containing fatty acid molecules, or at least one OH-containing fatty acid molecule and at least one OH-free fatty acid molecule.

Referring to the hydroxy fatty acid oligomer units (a), the hydrogenated castor oil fatty acid the main component of which is 12-hydroxystearic acid is suitably used as the OH-containing fatty acid. When necessary or where appropriate, the castor oil fatty acid the main component of which is ricinoleic acid may be used combinedly. The hydrogenated castor oil fatty acid is substantially free of any unsaturated group (i.e. the iodine value is substantially equal to zero), hence is most suitable from the heat resistance view-point. The castor oil fatty acids having an unsaturated group, when used in combination, advantageously produces a viscosity lowering effect. In the case of combined use of castor oil fatty acid, it is desirable that the castor oil fatty acid be used generally in an amount of not more than 1.1 moles, preferably not more than 0.5 mole, more preferably not more than 0.3 mole, per mole of the hydrogenated castor oil fatty acid. Other OH-containing fatty acids, such as dihydoxystearic acid, malic acid and lactic acid, may also be used in small proportions.

Further referring to the hydroxy fatty acid oligomer units (a), the OH-free fatty acid includes lauric acid, myristic acid, palmitic acid, stearic acid, isostearic acid, arachic acid, behenic acid, montanic acid, oleic acid, linolic acid, linolenic acid and so forth. Fatty acid mixtures comprising such components, for example coconut oil fatty acids, palm oil fatty acids, olive oil fatty acids, tallow fatty acids, hydrogenated tallow fatty acids and the like, as well as synthetic fatty acids comprising such components may also be used. Lower or medium fatty acids, such as butyric acid, valeric acid, caproic acid, enanthic acid, caprylic acid and capric acid, may be used as well.

The above-mentioned OH-containing fatty acid, alone or together with the OH-free fatty acid, is subjected to condensation reaction under heating at a temperature of about 180° to 240° C. (in particular under reflux) in an inert gas atmosphere, whereby a hydroxy fatty acid oligomer product is obtained. In this case, it is desirable that xylene or the like is caused to coexist in the reaction system to thereby remove the byproduct water azeotropically from the system. Although the use of a catalyst is generally unnecessary, the reaction may be carried out in the presence of a catalyst such as p-toluenesulfonic acid or sulfuric acid.

It is suitable that said hydroxy fatty acid oligomer product comprise dimer to heptamer (in particular trimer to pentamer). Said product may contain octamer and higher oligomers, however. It may further contain the monomer or monomers but, in this case, attention should be paid so that, on the average, said product corresponds to at least 1.5-mer, preferably at least 1.8-mer, more preferably at least 2.0-mer. When the proportion of dimer and higher oligomers is too small, the resulting polyester polyol (Y) sometimes fail to occur as a liquid at ordinary temperature and the polyurethane produced by using such polyester polyol (Y) as the polyol component is not satisfactorily resistant to heat and hydrolysis.

The fatty acid units (A) may contain fatty acid units other than said hydroxy fatty acid oligomer units (a) provided that the nonoligomer fatty acid units amount to not more than about 35% by weight. As the nonoligomer fatty acids that can be used in this case, there may be mentioned those OH-containing or OH-free fatty acids mentioned hereinabove.

The polyhydric alcohol units (B) preferably comprise, at least partly (preferably at least 50% by weight, more preferably at least 70% by weight), at least trihydric polyhydric alcohol units (b). This is because in cases where a diol alone is used or in diol-rich cases, the final composition, when used as an insulating sealant, is insufficient in adhesiveness and also because the polyester polyol (Y) obtained may have an excessively small number of functional groups (OH groups). Examples of the polyhydric (at least trihydric) alcohol are trimethylolpropane, pentaerythritol, dipentaerythritol, trimethylolethane, glycerol, polyglycerol, sorbitol, and alkylene oxide adducts derived from these. Examples of the diol are various glycols, polyether polyols, and alkylene oxide adducts derived from these. Nitrogen-containing polyols may also be used as the polyhydric alcohol. From the viewpoint of hydrolysis resistance, the use of a hindered alcohol is preferred.

The polyester polyol (Y) comprising such fatty acid units (A) and polyhydric alcohol units (B) as mentioned above can be prepared typically by subjecting the above-mentioned hydroxy fatty acid oligomer (with or without a nonoligomer fatty acid) and the above-mentioned polyhydric alcohol to esterification reaction under heating at a temperature of about 170° to 220° C. in an inert gas atmosphere in the presence of a catalyst such as p-toluenesulfonic acid, sulfuric acid, hydrochloric acid, phosphoric acid, sodium methylate or zinc chloride.

On that occasion, the hydroxy fatty acid oligomer (with or without the nonoligomer fatty acid) and the polyhydric alcohol are desirably used in a ratio such that the polyester polyol (Y) obtained has, on the average, at least 1.5 OH groups, preferably at least 1.8 OH groups. The upper limit to the number of OH groups is about 10.

It is also possible to first prepare a polyester polyol having a greater number of OH groups than the number aimed at and then reacting said polyester polyol with a dibasic acid such as adipic acid, azelaic acid or sebacic acid to thereby adjust the number of OH groups to the desired one. For accomplishing such adjustment, it is further possible to first react the dibasic acid with the polyhydric alcohol and then reacting the resulting product with the hydroxy fatty acid oligomer (with or without the nonoligomer fatty acid) or to subject the dibasic acid, polyhydric alcohol and hydroxy fatty acid oligomer (with or without the nonoligomer fatty acid) simultaneously to esterification reaction.

In addition to the methods mentioned above, the polyester polyol (Y) can also be prepared by starting with hydrogenated castor oil, alone or in combination with a triglyceride such as castor oil or a partial hydrolyzate obtained therefrom, and subjecting the same to esterification reaction with the OH-containing fatty acid alone or in combination with the OH-free fatty acid. Said polyol (Y) can also be prepared by directly esterifying the OH-containing fatty acid, alone or in combination with the OH-free fatty acid, with the polyhydric alcohol. In any case, it is in principle desirable to build up a reaction system in which the hydroxy fatty acid oligomer units (a) form a major proportion.

The thus-prepared polyester polyol (Y) is required to have an iodine value of not higher than 50 and to be a liquid at ordinary temperature. Iodine values exceeding 50 lead to an insufficient heat resistance. The iodine value is preferably not more than 40, more preferably not more than 30, and most preferably not more than 20. The requirement that the polyol (Y) should be a liquid at ordinary temperature can be readily satisfied, since the polyester polyol (Y) has hydroxy fatty acid oligomer units (a).

When the use of the intended composition as an insulating sealant is taken into consideration, it is desirable that the polyester polyol (Y) have an OH value of 50 to 300 (preferably 60 to 250, more preferably 70 to 200) and an average number of functional groups of not less than 1.7 (preferably 2 to 4, more preferably 2 to 3).

Proportions

As regards the proportions of the hydrogenated OH-containing liquid polyisoprene (X) and polyester polyol (Y) in the polyol component, it is appropriate that the latter be used in an amount of not less than 10 parts by weight (preferably not less than 15 parts by weight) but not more than 150 parts by weight (preferably not more than 120 parts by weight, more preferably not more than 100 parts by weight, most preferably not more than 80 parts by weight), per 100 parts by weight of the former. When the proportion of the latter is too small, a high viscosity may result, making it difficult to apply the composition as a sealant. When, conversely, said proportion is excessively high, the resistance to moist heat under high pressure will be sacrificed.

Other constituents of the polyol component

For the purpose of improving compatibility, providing further flexibility and/or decreasing viscosity, for instance, the polyol may further comprise, in combination with the above-mentioned constituents (X) and (Y), one or more of commonplace diols, such as polyether polyols, polyester polyols, octanediol, castor oil, acetylated castor oil and hydrogenated dimer acid diols, in an appropriate amount (e.g. less than 50% by weight, preferably not more than 40% by weight, more preferably not more than 30% by weight, relative to the total amount of the polyol component).

Polyisocyanate component

As the polyisocyanate component, there may be mentioned various polyisocyanates such as 4,4'- or 2,4'-diphenylmethanediisocyanate, carbodiimide modification of diphenylmethanediisocyanate, polymerized diphenylmethanediisocyanate, hydrogenated diphenylmethanediisocyanate, tolylene diisocyanate, xylylene diisocyanate, hexamethylene diisocyanate, trimethylhexamethylene diisocyanate, isophoronediisocyanate, phenylene diisocyanate, naphthalenediisocyanate, triphenylmethanediisocyanate, diphenyl sulfone diisocyanate, 3-isocyanatomethyl-3,5,5-trimethylcyclohexyl isocyanate and 3-isocyanatoethyl-3,5,5-trimethylcyclohexyl isocyanate, diphenylpropanediisocyanate, diphenyl ether-4,4'-diisocyanate, cyclohexylene diisocyanate, 3,3'-diisocyanatodipropyl ether, and urethane modifications, dimers, trimers, carbodiimide modifications, allophanate modifications, urea modifications, biuret modifications, prepolymers and blocked modifications of such polyisocyanates. When weather resistance is required, it is desirable that nonyellowing polyisocyanates such as hexamethylene diisocyanate and isophoronediisocyanate be selected and used.

Urethane-forming curable composition and insulated electric or electronic parts or devices The insulating urethane-forming curable composition of the present invention comprises the above-mentioned polyol component and polyisocyanate component. For attaining a sufficient degree of cure, the ratio between both components as expressed in terms of NCO/OH equivalent ratio is preferably 0.7 to 1.4, more preferably 0.8 to 1.2.

In preparing said composition, one or more additives selected from among chain extenders, crosslinking agents, fillers, pigments, loading materials, flame retardants, plasticizers, urethane formation catalysts, ultraviolet absorbers, antioxidants, antiaging agents, moisture absorbers, antifoams, antifungal agents, silane or titane coupling agents and so forth may be incorporated each in an appropriate amount. In cases where a plasticizer is used, it is desirable that the plasticizer be one which shows only a small loss in weight at elevated temperatures, for example a hydrogenated $C_{8-14}$ alpha-olefin oligomer, in particular a hydrogenated 1-decene oligomer. Such plasticizer is used generally in an amount of not more than 100 parts by weight, preferably not more than 70 parts by weight, more preferably not more than 50 parts by weight, per 100 parts by weight of the sum total of the polyol and polyisocyanate components. Various other plasticizers, for example paraffin-based process oils and ethylene-alpha-olefin cooligomers, may also be used.

The composition prepared by blending the above-mentioned components together, when applied to electric or electronic parts or devices for sealing them by casting in the conventional manner and then allowed to cure, gives insulated electric or electronic parts or devices provided with moistureproofness by the curing product obtained from said composition. The curing can be carried out at a temperature from room temperature to about 100° C.; the higher the temperature is, the more accelerated the curing reaction is. The curing time is recommendaly about 1 to 7 days in the case of room temperature curing, or about 1 to 10 hours in the case of curing at 100° C. The curing conditions to be actually employed can suitably be selected according to the curing equipment available and other factors. For instance, after casting, the cast resin composition is heated at 60° C. for 1 hour to effect curing to an extent such that said composition no more flows out. Thereafter, the composition is allowed to stand at room temperature for 4 days or so.

It is particularly desirable that, in the insulated electric or electronic parts or devices obtained by moistureproof treatment with the curing product from the above-mentioned composition, the cured composition have a hardness at –20° C. of not more than 80 as expressed on the JIS A scale so that troubles such as cracking upon soldering can be avoided. Therefore, attention should be paid to the conditions of compounding said composition so that such hardness can be obtained.

Effects

The above-mentioned hydrogenated OH-containing liquid polyisoprene (X) advantageously provides good heat resistance and flexibility but, by nature, has a high viscosity. Even when an attempt is made to reduce the viscosity by combined use of an ordinary polyol, it is difficult to attain the desired viscosity reduction without using a plasticizer or diluent in large amounts, because of poor compatibility between (X) and such polyol. Even if a composition prepared according to such formulation is used as an insulating sealant, the curing product will undergo hardness changes with time, failing to fully utilize the original characteristics of the OH-containing hydrogenated liquid polyisoprene (X).

On the contrary, when said hydrogenated OH-containing liquid polyisoprene (X) is used in combination with the specific polyester polyol (Y) defined hereinabove, the resulting final composition, when used for sealing electric or electronic parts or devices, can go around even into minute cavities or the like of said parts or devices owing to its low viscosity and, furthermore, can give flexible curing products showing good heat resistance, hydrolysis resistance (moisture resistance) and moistureproofness. Hence, hardness changes and insulating performance reduction can be prevented for a prolonged period of time even under severe conditions and therefore the electric or electronic parts or devices can be protected in a reliable manner.

The degree of condensation of the hydroxy fatty acid oligomer units (a), which are essential constituent units in the fatty acid units (A) of the polyester polyol (Y), can be adjusted arbitrarily and therefore the final composition can be designed so that those characteristics which are required by users can be obtained.

EXAMPLES

The following examples are further illustrative of the present invention. In the following, "part(s)" means "part(s) by weight".

Example 1

Hydrogenated OH-containing liquid polyisoprene (X)

As the hydrogenated OH-containing liquid polyisoprene (X), Idemitsu Petrochemical's "Epol" (number average molecular weight 1,400; degree of hydrogenation ca. 100%; viscosity 110 Pa·s/23° C.) was prepared.

Synthesis of polyester polyol (Y)

A reactor equipped with a stirrer, a thermometer, a nitrogen inlet tube and a reflux condenser with a water-measuring tube was charged with 1,220 g (4 moles) of a hydrogenated castor oil fatty acid mixture with an acid value of 178 and 60 ml of xylene for assisting refluxing, and the reactor contents were heated at 200° to 220° C. under nitrogen for 6 hours while the water formed by the condensation reaction was azeotropically removed from the system. Thus was obtained a hydroxy fatty acid oligomer product with an acid number of 46, corresponding to the tetramer of the above-mentioned fatty acid mixture.

To the reactor was then added, as an example of the polyhydric alcohol, 134 g (1 mole) of trimethylolpropane, which is a hindered alcohol, and 1.0 g of p-toluenesulfonic acid as a catalyst, and the reaction was allowed to proceed at 180° to 200° C. for 7 hours, while the water formed by the condensation reaction was azeotropically removed from the system. After completion of the reaction, the catalyst and xylene were removed. Thus was obtained a liquid polyester polyol (Y), which was liquid at ordinary temperature and had an acid value of 3.3, a hydroxyl value of 105, an iodine value of 3.2 and a viscosity of 2.1 Pa·s/23° C.

Preparation and curing of the urethane-forming curable composition

Using the above-mentioned hydrogenated OH-containing liquid polyisoprene (X) and polyester polyol (Y) combinedly as the polyol component in the proportions specified below in Table 1 and using liquid MDI (diphenylmethanediisocyanate; Nippon Polyurethane Industry's "Millionate MTL") as the polyisocyanate component, curable compositions having an NCO/OH equivalent ratio of 1 were prepared. They were subjected to viscosity measurement. They were respectively cast into molds and cured at 60° C. for 16 hours (for hardness testing) or 48 hours (for other tests), whereby specimens having a diameter of 50 mm and a thickness of 10 mm were obtained. The specimens were submitted to various tests and evaluations.

Viscosity of each composition and heat resistance and hydrolysis resistance of each curing product Each composition was measured for viscosity and evaluated for castability while each curing product was evaluated for heat resistance, hydrolysis resistance and electrical characteristics. The conditions and results are shown in Table 1.

For heat resistance evaluation, each specimen was placed and maintained in an oven at 150° C. for 2,000 hours. For hydrolysis resistance evaluation, each specimen was exposed to the following wet heat test conditions for 100 hours: temperature 121° C., relative humidity 100%, steam pressure 2 kg/cm$^2$.

Referring to Table 1 and to Tables 2 and 3 which appear later herein, the castability evaluation was made by casting the mixed test composition into a mold (130 mm×130 mm×3 mm thickness); when the composition could flow into the mold completely to the bottom without allowing air bubble formation, its castability was evaluated as "O" (good) whereas when it failed to do so, as "X" (poor). As regards the hardness at −20° C., a hardness not more than JIS A 80 was evaluated as "O" while a hardness exceeding 80, as "X". As regards the hardness after heat resistance testing, the test specimen after heat resistance testing was cooled to 23° C. and subjected to hardness measurement; when the change in hardness as compared with the initial value was within the range ±5, the heat resistance was evaluated as "O" while said change exceeded said range, as "X". As regards the hardness after hydrolysis resistance testing, when the change in hardness as compared with the initial value was within the range ±5, the heat resistance was evaluated as "O" while said change exceeded said range, as "X".

Referring to Table 1 and to Tables 2 and 3 which appear later herein, the electrical characteristics after heat resistance testing were evaluated as "O" when the volume resistivity was not less than $10^{14}$ Ω·cm whereas when the resistivity was less, as "X". The electrical characteristics after hydrolysis resistance testing were evaluated as "O" when the volume resistivity was not less than $10^{12}$ Ω·cm whereas when the resistivity was less, as "X". In each table, the data $3\times10^{14}$, for instance, was expressed as $3E^{14}$ for reasons of space.

TABLE 1

|  | No. 1 | No. 2 | No. 3 | No. 4 |
|---|---|---|---|---|
| Constituents of polyol component |  |  |  |  |
| Hydrogenated polyisoprene (X) | 100 | 100 | 100 | 100 |
| Polyester polyol (Y) | 10 | 30 | 50 | 100 |
| Polyisocyanate Liquid MDI | 15.4 | 20.3 | 26.0 | 37.4 |
| Viscosity of composition |  |  |  |  |
| (Pa · s) | 42 | 36 | 15 | 7 |
| Castability | o good | o good | o good | o good |
| Hardness (JIS A) |  |  |  |  |
| Initial hardness (23° C.) | 52 | 51 | 50 | 49 |
| Hardness at −20° C. | o 72 | o 73 | o 73 | o 73 |
| After 2,000 hours of heat resistance testing (150° C.) | o 53 | o 50 | o 48 | o 47 |
| After 100 hours of hydrolysis resistance testing (121° C., 100% RH, 2 kg/cm$^2$) | o 50 | o 46 | o 45 | o 45 |
| Volume resistivity $\rho_v$ (Ω · cm) |  |  |  |  |
| Initial volume resistivity | $3E^{14}$ | $2E^{14}$ | $2E^{14}$ | $1E^{14}$ |
| After 2,000 hours of heat resistance testing (150° C.) | o $6E^{14}$ | o $6E^{14}$ | o $6E^{14}$ | o $5E^{14}$ |
| After 100 hours of hydrolysis resistance testing (121° C., 100% RH, 2 kg/cm$^2$) | o $3E^{13}$ | o $1E^{13}$ | o $1E^{13}$ | o $9E^{12}$ |

Compatibility of polyol constituents

One hundred (100) parts of the hydrogenated polyisoprene (X) used in the above examples and 50 or 100 parts of the polyester polyol (Y) used in the above examples or one of various other polyols were mixed together and allowed to stand at 23° C. for 14 days and then observed for compatibility; when no phase separation was observed, the compatibility was judged as "O" and, when phase separation was observed, as "X". In the following, "hydrogenated IP (X)" means the hydrogenated polyisoprene (X) used in the above examples and "PPG" means polypropylene glycol.

Hydrogenated IP (X) 100 parts
    +polyester polyol (Y) 50 parts→O
Hydrogenated IP (X) 100 parts
    +polyester polyol (Y) 100 parts→O
Hydrogenated IP (X) 100 parts
    +polybutadiene polyol (Y) 50 parts→X
Hydrogenated IP (X) 100 parts
    +polybutadiene polyol (Y) 100 parts→X
Hydrogenated IP (X) 100 parts
    +PPG (mol. wt. 1,000) (Y) 50 parts→X
Hydrogenated IP (X) 100 parts
    +PPG (mol. wt. 1,000) (Y) 100 parts→X
Hydrogenated IP (X) 100 parts
    +castor oil transesterification product (Y) 50 parts→O
Hydrogenated IP (X) 100 parts
    +castor oil transesterification product (Y) 100 parts→O
Hydrogenated IP (X) 100 parts
    +dimer acid diol (Y) 50 parts→O
Hydrogenated IP (X) 100 parts
    +dimer acid diol (Y) 100 parts→O
Hydrogenated IP (X) 100 parts
    +castor oil (Y) 50 parts→X
Hydrogenated IP (X) 100 parts
    +castor oil (Y) 100 parts→X Comparative Examples 1 to 9

For comparison, experiments were conducted according to the formulations shown in Table 2 and Table 3. The hydrogenated polyisoprene (X) and liquid MDI used were the same as those used in Example 1. The conditions and results are shown in Table 2 and Table 3.

TABLE 2

| | Comparative Example | | | | |
|---|---|---|---|---|---|
| | 1 | 2 | 3 | 4 | 5 |
| Constituents of polyol component | | | | | |
| Hydrogenated polyisoprene (X) | 100 | 100 | 100 | 100 | |
| Castor oil transesterification product | 20 | 40 | 60 | | |
| Castor oil | | | | 100 | |
| Polyisocyanate Liquid MDI | 21 | 29 | 37 | 42 | 13 |
| Viscosity of composition | | | | | |
| (Pa · s) | 22 | 12.5 | 8.3 | 0.3 | 55 |
| Castability | o good | o good | o good | o good | x bad |
| Hardness (JIS A) | | | | | |
| Initial hardness (23° C.) | 42 | 45 | 45 | 75 | 55 |
| Hardness at −20° C. | x 85 | x 90 | x 95 | x 95 | o 75 |
| After 2,000 hours of heat resistance testing (150° C.) | x 75 | x 95 | x 95 | x 95 | o 55 |
| After 100 hours of | x 32 | x 25 | x 20 | x | o 55 |

TABLE 2-continued

| | Comparative Example | | | | |
|---|---|---|---|---|---|
| | 1 | 2 | 3 | 4 | 5 |
| hydrolysis resistance testing (121° C., 100% RH, 2 kg/cm$^2$) Volume resistivity $\rho_v$ (Ω · cm) | | | | Dissolution | |
| Initial volume resistivity | 7E$^{14}$ | 5E$^{14}$ | 5E$^{14}$ | 9E$^{14}$ | 2E$^{14}$ |
| After 2,000 hours of heat resistance testing (150° C.) | o 9E$^{14}$ | o 6E$^{14}$ | o 6E$^{14}$ | o 8E$^{14}$ | o 7E$^{14}$ |
| After 100 hours of hydrolysis resistance testing (121° C., 100% RH, 2 kg/cm$^2$) | o 9E$^{12}$ | o 6E$^{12}$ | o 3E$^{12}$ | x — | o 7E$^{14}$ |

TABLE 3

| | Comparative Example | | | |
|---|---|---|---|---|
| | 6 | 7 | 8 | 9 |
| Constituents of polyol component | | | | |
| Hydrogenated polyisoprene (X) | 100 | 100 | 100 | |
| Dimer acid diol | 50 | 100 | 150 | |
| Polybutadiene polyol | | | | 100 |
| Polyisocyanate Liquid MDI | 39 | 65 | 91 | 12 |
| Viscosity of composition | | | | |
| (Pa · s) | 18.5 | 7 | 4.7 | 7 |
| Castability | o good | o good | o good | o good |
| Hardness (JIS A) | | | | |
| Initial hardness (23° C.) | 58 | 87 | 92 | 35 |
| Hardness at −20° C. | x 91 | x 95 | x 96 | o 40 |
| After 2,000 hours of heat resistance testing (150° C.) | o 60 | o 92 | o 96 | x 98 |
| After 100 hours of hydrolysis resistance testing (121° C., 100% RH, 2 kg/cm$^2$) | o 55 | x part. diss. | x part. diss. | o 40 |
| Volume resistivity $\rho_v$ (Ω · cm) | | | | |
| Initial volume resistivity | 7E$^{14}$ | 6E$^{14}$ | 5E$^{14}$ | 1E$^{15}$ |
| After 2,000 hours of heat resistance testing (150° C.) | o 8E$^{14}$ | o 8E$^{14}$ | o 9E$^{14}$ | o 9E$^{14}$ |
| After 100 hours of hydrolysis resistance testing (121° C., 100% RH, 2 kg/cm$^2$) | o 2E$^{13}$ | x part. diss. | x part. diss. | o 9E$^{13}$ |

Note: "Part. diss." = partial dissolution.

Examples 2 to 10

Polyester polyols (Y) were prepared in the same manner as in Example 1 except that the kind of hydroxy fatty acid and the amount were varied and that the hydroxy fatty acid oligomers obtained were then reacted with various polyhydric alcohols. The conditions employed for synthesizing the polyester polyols (Y) and the characteristics of said polyols (Y), inclusive of those in the case of Example 1, are shown in Table 4. In the table, each value in parentheses ( ) means the number of moles of the material charged. "HCOFA" stands for hydrogenated castor oil fatty acid, "COFA" for castor oil fatty acid, "Cap" for caprylic acid, and "Adi" for adipic acid. "TMP" stands for trimethylolpropane, "Gly" for glycerol, "SorPO" for sorbitolpropylene oxide adduct, and "GlyPO" for glycerolpropylene oxide adduct. "CO" stands for castor oil, and "HCO" for hydrogenated castor oil. "OHV" stands for hydroxyl value, "IV" for iodine value, and "Vis." for viscosity (Pa·s/23° C.).

TABLE 4

| Example | Synthesis conditions | OHV | IV | Vis. | Appearance |
|---|---|---|---|---|---|
| 1 | [HCOFA(4)] tetramer + TMP(1) | 105 | 3.2 | 2.1 | Liquid |
| 2 | [HCOFA(4)] tetramer + TMP(1) + Adi(1.0) | 59 | 1.3 | 2.9 | Liquid |
| 3 | [HCO(1) + CO(1) + HCOFA(4)] reaction product | 71 | 27.0 | 2.5 | Liquid |
| 4 | [HCOFA(3) + COFA(1)] tetramer + TMP(1) | 104 | 23.8 | 1.8 | Liquid |
| 5 | [HCOFA(2)] dimer + TMP(1) | 194 | 2.8 | 1.4 | Liquid |
| 6 | [HCOFA(4)] tetramer + Gly(1) | 95 | 1.1 | 3.8 | Liquid |
| 7 | [HCOFA(4) tetramer + SorP)(1) | 171 | 2.4 | 2.5 | Liquid |
| 8 | [HCOFA(2)] dimer + GlyPO(1) | 173 | 2.6 | 1.0 | Liquid |
| 9 | [HCOFA(4) tetramer + GlyPO(1) | 83 | 2.5 | 1.6 | Liquid |
| 10 | [HCOFA(3)] trimer + TMP(1) + Cap(0.6) | 112 | 3.8 | 1.1 | Liquid |

The use of the polyester polyols (Y) of Examples 2 to 10 in lieu of the polyester polyol (Y) of Example 1 gave substantially the same results as obtained in Example 1.

EFFECTS OF THE INVENTION

The insulating urethane-forming curable composition of the present invention, when used for sealing electric or electronic parts or devices, can go around even into minute cavities or the like of said parts or devices owing to its low viscosity and, furthermore, can give flexible curing products showing good heat resistance, hydrolysis resistance (moisture resistance) and moistureproofness. Hence, hardness changes and insulating performance reduction can be prevented for a prolonged period of time even under severe conditions and therefore the electric or electronic parts or devices can be protected in a reliable manner.

What is claimed is:

1. An insulating urethane-forming curable composition comprising a polyol component and a polyisocyanate component which composition is characterized in that the polyol component comprises a hydrogenated OH-containing liquid polyisoprene (X) and a polyester polyol (Y) which is composed of fatty acid units (A) and polyhydric alcohol units (B), occurs as a liquid at ordinary temperature and has an iodine value of not more than 50, and that the fatty acid units (A) in said polyester polyol (Y) at least partly comprise at least dimer hydroxy fatty acid oligomer units (a) resulting from condensation of at least two OH-containing fatty acid molecules, or at least one OH-containing fatty acid molecule and at least one OH-free fatty acid molecule.

2. An insulating urethane-forming curable composition as claimed in claim 1, wherein the fatty acid units (A) in said polyester polyol (Y) at least partly comprise at least dimer hydroxy fatty acid oligomer units (a) resulting from condensation of at least two OH-containing fatty acid molecules, or at least one OH-containing fatty acid molecule and at least one OH-free fatty acid molecule and wherein the polyhydric alcohol units (B) in said polyester polyol (Y) are at least partly at least trihydric alcohol units (b).

3. An insulating urethane-forming curable composition as claimed in claim 1 or 2, wherein the OH-containing fatty acid constituting the hydroxy fatty acid oligomer units (a) is hydrogenated castor oil fatty acid or a combination of hydrogenated castor oil fatty acid and castor oil fatty acid.

4. An insulating urethane-forming curable composition as claimed in claim 1, wherein the amount of the polyester polyol (Y) in the polyol component is 10 to 150 parts by weight per 100 parts by weight of the hydrogenated OH-containing liquid polyisoprene (X).

5. An insulated electric or electronic part or device as treated for moistureproofness with the curing product obtained from the insulating urethane-forming curable composition of claim 1.

6. An insulated electric or electronic part or device as claimed in claim 5, wherein the curing product shows a hardness of not more than JIS A 80 at −20° C.

* * * * *